United States Patent [19]
Uchiyama et al.

[11] Patent Number: 5,404,423
[45] Date of Patent: Apr. 4, 1995

[54] METHOD AND APPARATUS FOR INDETIFICATION, FORECAST, AND CONTROL OF A NON-LINEAR FLOW ON A PHYSICAL SYSTEM NETWORK USING A NEURAL NETWORK

[75] Inventors: Tadasu Uchiyama; Noboru Sonehara; Yukio Tokunaga, all of Kanagawa, Japan

[73] Assignee: Nippon Telegraph and Telephone Corporation, Tokyo, Japan

[21] Appl. No.: 48,793

[22] Filed: Apr. 16, 1993

[30] Foreign Application Priority Data

Jun. 16, 1992 [JP] Japan .................................. 4-156796
Oct. 19, 1992 [JP] Japan .................................. 4-279997

[51] Int. Cl.⁶ ............................................. G06F 15/18
[52] U.S. Cl. ........................................ 395/22; 395/21; 395/23
[58] Field of Search ........................ 395/22, 21, 23, 24, 395/

[56] References Cited

U.S. PATENT DOCUMENTS

| | | | |
|---|---|---|---|
| 4,990,838 | 2/1991 | Kawato et al. | 395/22 |
| 5,003,490 | 3/1991 | Caslelaz et al. | 395/22 |
| 5,050,096 | 9/1991 | Seidman | 395/22 |
| 5,166,927 | 11/1992 | Iida et al. | 370/60 |

OTHER PUBLICATIONS

Neural Network Modeling and Control of an Anti Lock Brake, L. I. Davis 29/Jun.–1/Jul. 1992 IEEE.
Authors: Leslie C. Edie; Denos C. Gazis; Walter Helly; Donald R. McNeil and George H. Weiss. Title: Traffic Science. Sep., 1973. pp. 1-87.
Authors: David E. Rumelhart, Geoffrey E. Hinton & Ronald J. Williams. Title: Learning representations by back-propagating errors; Nature, vol. 323 dated 9 Oct. 1986. pp. 533-536.

*Primary Examiner*—Allen R. MacDonald
*Assistant Examiner*—Richemond Dorvil
*Attorney, Agent, or Firm*—Allegretti & Witcoff, Ltd.

[57] ABSTRACT

A neural network system for identifying forecasting, and controlling a non-linear flow on a physical system network, in which each branch between nodes in the physical system network is divided by a plurality of division points; a flow at each of the division points and a terminal point of each branch is calculated according to neural network model parameters specifying connections among the division points and the terminal point in a neural network model; an actual flow is measured at the terminal point of said each branch; an error of the calculated flow at the terminal point with respect to the measured actual flow at the terminal point is calculated; the neural network model parameters are adjusted to minimize the calculated error; and system dynamics parameters specifying dynamics of the physical system are determined according to the adjusted neural network model parameters. In addition, a target function to be optimized is calculated in terms of flows at terminal points of branches as a function of a control parameter specifying connecting and disconnecting of connections among branches at each node; and connections among branches at each node are connected/disconnected to optimize the calculated target function.

20 Claims, 7 Drawing Sheets

INPUT LAYER   HIDDEN LAYER   OUTPUT LAYER

METHOD AND APPARATUS FOR INDETIFICATION, FORECAST, AND CONTROL OF A NON-LINEAR FLOW ON A PHYSICAL SYSTEM NETWORK USING A NEURAL NETWORK

BACKGROUND OF THE INVENTION

1. Field of the Invention

The present invention relates to a neural network, and more particularly, to a use of the neural network for an identification, a forecast, and a control of a non-linear flow on a physical system network.

2. Description of the Background Art

Conventionally, an identification, a forecast, and a control of a non-linear flow on a physical system network has been realized by a multi-layer perceptron in which various units forming the perceptron are provided on multiple layers. In the following, this conventionally utilized multi-layer perceptron will be described briefly.

In the multi-layer perceptron, each unit comprises a part for receiving outputs of the other units, a part for determining an internal state of this unit according to the outputs received, and a part for outputting the determined internal state of this unit applied with a non-linear transformation, as depicted conceptually in FIG. 1 for a case of the discrete-time continuous-output model, and in FIG. 2 for a case of the continuous-time continuous-ouput model.

In the discrete-time continuous-output model shown in FIG. 1, the unit 1 receives the outputs $z_1, z_2, \ldots, z_N$ from the other units $1, 2, \ldots, N$, and the internal state $u_i$ of this unit i is defined as a weighted sum of these outputs which can be calculated by using the corresponding connection weight values $w_{i1}, w_{i2}, \ldots, w_{iN}$ reflecting the connection state among the units, according to the following equation (1).

$$u_i = \sum_{j=1}^{N} w_{ij} z_j \qquad (1)$$

The output $z_i$ of this unit i is then obtained by transforming this internal state $u_i$ by using a non-linear function f, according to the following equation (2).

$$z_i = f(u_i) \qquad (2)$$

On the other hand, in the continuous-time continuous-output model shown in FIG. 2, the internal state $u_i$ is defined by the following differential equation (3).

$$\frac{du_i}{dt} = \sum_{j=1}^{N} w_{ij} z_j \qquad (3)$$

The output $z_i$ of this unit i in the continuous-time continuous-output model is obtained according to the above equation (2), just as in a case of the discrete-time continuous-output model of FIG. 1.

An exemplary conceptual configuration of a three-layer perceptron formed by such units is shown in FIG. 3, which comprises: an input layer formed by three units, a hidden layer formed by two units, and an output layer formed by two units. This three-layer perceptron can be utilized for establishing the correspondence between an input in a form of a three-dimensional vector and an output in a form of a two-dimensional vector. In such a perceptron, all the units carry out basically the same type of the processing, with different settings of the connection weight values $w_{ij}$. Therefore, it is necessary to determine the settings of the connection weight values $w_{ij}$ appropriately, so as to be able to obtain a desired output for a given input.

Conventionally, this determination of the appropriate settings of the connection weight values has been realized by using the error back-propagation algorithm which is a learning algorithm for minimizing the error between the desired output for the given input and the actual output obtained by the neural network, by using the steepest gradient descent method. In the following, this error back-propagation algorithm will be described briefly. (See D. E.Rumelhart et al., "Learning representations by back-propagating errors", Nature Vol. 323, pp. 533–536, 1986, for further detail.)

In the error back-propagation algorithm, each unit is assumed to be in the discrete-time continuous-output model of FIG. 1 described above, and for a given input (vector) X, a desired output (vector) is denoted by Y(X), while the actual output (vector) obtained by the neural network is denoted by Z(X). Then, an objective function E to be minimized is defined as a sum of a squared error of the actual output Z(X) with respect to the desired output Y(X), according to the following equation (4).

$$E = \frac{1}{2} \sum_{x} |Z(X) - Y(X)|^2 \qquad (4)$$

Then, the connection weight values $w_{ij}$ for minimizing this objective function E can be obtained as the convergence points $w_{ij}(\infty)$ of the solution of the following differential equation (5).

$$\frac{dw_{ij}}{dt} = -\frac{\partial E}{\partial w_{ij}} \qquad (5)$$

Now, using the multi-layer perceptron as described above, the conventional method for an identification and a forecast of a non-linear flow on a physical system network constructed from N directed graphs as shown in FIG. 4 will be described.

In this physical system network shown in FIG. 4, the directed graphs are labelled by numbers $i = 1, 2, \ldots, N$ (N=12 in FIG. 4), and a flow observed at a terminal point of a branch j at a time t will be denoted as $Q_j(t)$. Then, the flow to be observed at a terminal point of a branch j at a time t is determined from past records of the flows $Q_i(t - M\Delta\tau), \ldots, Q_i(t - \Delta\tau)$, where M is a natural number, $\Delta\tau$ is a positive constant real number, and $i = 1, 2, \ldots, N$.

In the conventional method for an identification and a forecast of a non-linear flow on a physical system network, the correspondence between the flow at a given time and the past records of the flows is established by using the three-layer perceptron comprising an input layer formed by NM units, a hidden layer formed by an appropriate number of units, and an output layer formed by a single unit, as shown in FIG. 5 which shows a case of N=12 and M=2 (a number of units in the input layer is 12×2=24) and a number of units in the hidden layer is four. Note here that, although not explicitly indicated in FIG. 5, each unit of the hidden layer is connected with all the units of the input layer, and the unit of the output layer is connected with all the units of the hidden layer.

Then, the connection weight values are determined according to the above differential equation (5), by regarding the past records of the flows $Q_i(t-M\Delta\tau), \ldots, Q_i(t-\Delta\tau)$ as the input $X(t)$, and the flow $Q_j(t)$ as the desired output $Y(X(t))$ for this input $X(t)$, and using the objective function to be minimized defined by the following equation (6).

$$E = \frac{1}{2} \sum_t |Z(X(t)) - Y(X(t))|^2 \qquad (6)$$

In this manner, the flow at a time $(t+\Delta\tau)$ can be forecasted from the past records of the flows from a time $(t-(M-1)\Delta\tau)$ to a present time t.

Next, using the multi-layer perceptron as described above, the conventional method for a control of a non-linear flow on a physical system network will be described by regarding the physical system network shown in FIG. 4 as a traffic network, in which four nodes A, B, C, and D are considered as crossroads equipped with traffic signals. Here, in correspondence to the "red" signal and the "green" signal of each traffic signal, the signal control parameter $s_k$ (k=A, B, C D; $S_k \in \{0, 1\}$ is defined.

Then, the correspondence of the flow $Q_j(t)$ to be observed at a terminal point of a branch j at a time t with respect to the flow $Q_i(t-T)$ (i=1, 2, ..., N) and the signal control parameter $s_k(t-T)$ (k=A, B, C, D) at a time $(t-T)$ is established by using the three-layer perceptron such as that shown in FIG. 5. Here, for example, the input layer can be formed by 12+4 units in correspondence to the 12 branches and 4 nodes used in the traffic network of FIG. 4.

Then, the connection weight values are determined according to the above differential equation (5), by regarding the flow $Q_i(t-T)$ and the signal control parameter $s_k(t-T)$ as the input $X(t)$, and the flow $Q_j(t)$ as the desired output $Y(X(t))$ for this input $X(t)$, and using the objective function to be minimized defined by the above equation (6).

In this manner, the flow $Q_j(t+T)$ forecasted for a crossroad of interest at a time $(t+T)$ can be obtained by calculating $Z(X(t))$ from the flow $Q_i(t)$ and the signal control parameter $s_k(t)$ as the input $X(t)$ for the present time t.

Consequently, the optimum control at the present time for maximizing the flow at a time $(t+T)$ can be realized by calculating $Z(X(t))$ for all the combinations of the control parameters, and the selecting the setting of the control parameters for which the flow at a time $(t+T)$ is forecasted to be maximum.

Now, the conventional method for an identification, a forecast, and a control of a non-linear flow on a physical system network described above is associated with various problems as follows.

First, the multi-layer perceptron utilized in the conventional method is designed quite independently from the connection state (topology) of the physical system network to be dealt with. As a consequence, when the connection state in the physical system network is partially changed, it is necessary to re-determine all the connection weight values according to the above differential equation (5).

Also, in a case of dealing with a large scale physical system network, i.e., a case in which the input and output vectors have large dimensionality, the number of units required in the hidden layers also becomes large, so that the size of the multi-layer perceptron itself becomes large. However, in the learning of the large scale perceptron using the steepest gradient descent method, the convergence of the solution of the above differential equation (5) to the local minimum of the objective function E is obtained at a very high probability, rather than the desired convergence to the global minimum.

In addition, in the conventional method for an identification, only the correspondence between the inputs and the outputs is established, so that it has been impossible to derive the system dynamics parameters specifying the dynamics of the physical system represented by the physical system network, such as the sink and the source at non-observed points on the physical system network, from the connection weight values determined by the learning. In other words, the conventional method has been addressing only the direct problem for the non-linear system, so that the inverse problem of the non-linear system cannot be handled by the conventional method.

Moreover, in the conventional method for a forecast, it has only been possible to make the forecast in units of prescribed unit time such as 15 minutes or 30 minutes, and it has been impossible to make the forecast for an arbitrary time. As a consequence, the conventional method for a control can also be carried out only in units of this prescribed unit time.

SUMMARY OF THE INVENTION

It is therefore an object of the present invention to provide a method and an apparatus for an identification, a forecast, and a control of a non-linear flow on a physical system network, capable of accounting for the connection state (topology) of the physical system network.

It is another object of the present invention to provide a method and an apparatus for an identification, a forecast, and a control of a non-linear flow on a physical system network, capable of obtaining the desired convergence to the global minimum in the learning, even in a case of dealing with a large scale physical system network.

It is another object of the present invention to provide a method and an apparatus for an identification of a non-linear flow on a physical system network, capable of deriving the system dynamics parameters specifying the dynamics of the physical system represented by the physical system network from the result of the learning.

It is another object of the present invention to provide a method and an apparatus for a forecast and a control of a non-linear flow on a physical system network, capable of making the forecast and carrying out the control for an arbitrary time.

According to one aspect of the present invention there is provided a method for an identification, a forecast, and a control of a non-linear flow on a physical system network representing a physical system, comprising the steps of: (a) dividing each branch between nodes in the physical system network by a plurality of division points; (b) calculating a flow at each of the division points and a terminal point of said each branch according to neural network model parameters specifying connections among the division points and the terminal point in a neural network model representing the physical system network; (c) measuring an actual flow at the terminal point of said each branch; (d) calculating an error of the flow at the terminal point calculated at the step (b) with respect to the actual flow at the terminal point measured at the step (c); (e) adjusting the neural network model parameters, so as to minimize the error calculated at the step (d); and (f) determining system dynamics parameters specifying dynamics of the physical system represented by the physical system network, according to the neural network model parameters adjusted at the step (e).

According to another aspect of the present invention there is provided an apparatus for an identification, a forecast, and a control of a non-linear flow on a physical system network representing a physical system in which each branch between nodes is divided by a plurality of division points; flow calculation means for calculating a flow at each of the division points and a terminal point of said each branch according to neural network model parameters specifying connections among the division points and the terminal point in a neural network model representing the physical system network; flow measurement means for measuring an actual flow at the terminal point of said each branch; error calculation means for calculating an error of the flow at the terminal point calculated by the flow calculation means with respect to the actual flow at the terminal point measured by the flow measurement means; learning means for adjusting the neural network model parameters, so as to minimize the error calculated by the error calculation means; and determining means for determining system dynamics parameters specifying dynamics of the physical system represented by the physical system network, according to the neural network model parameters adjusted by the learning means.

Other features and advantages of the present invention will become apparent from the following description taken in conjunction with the accompanying drawings.

DETAILED DESCRIPTION OF THE PREFERRED EMBODIMENTS

Figure 6:
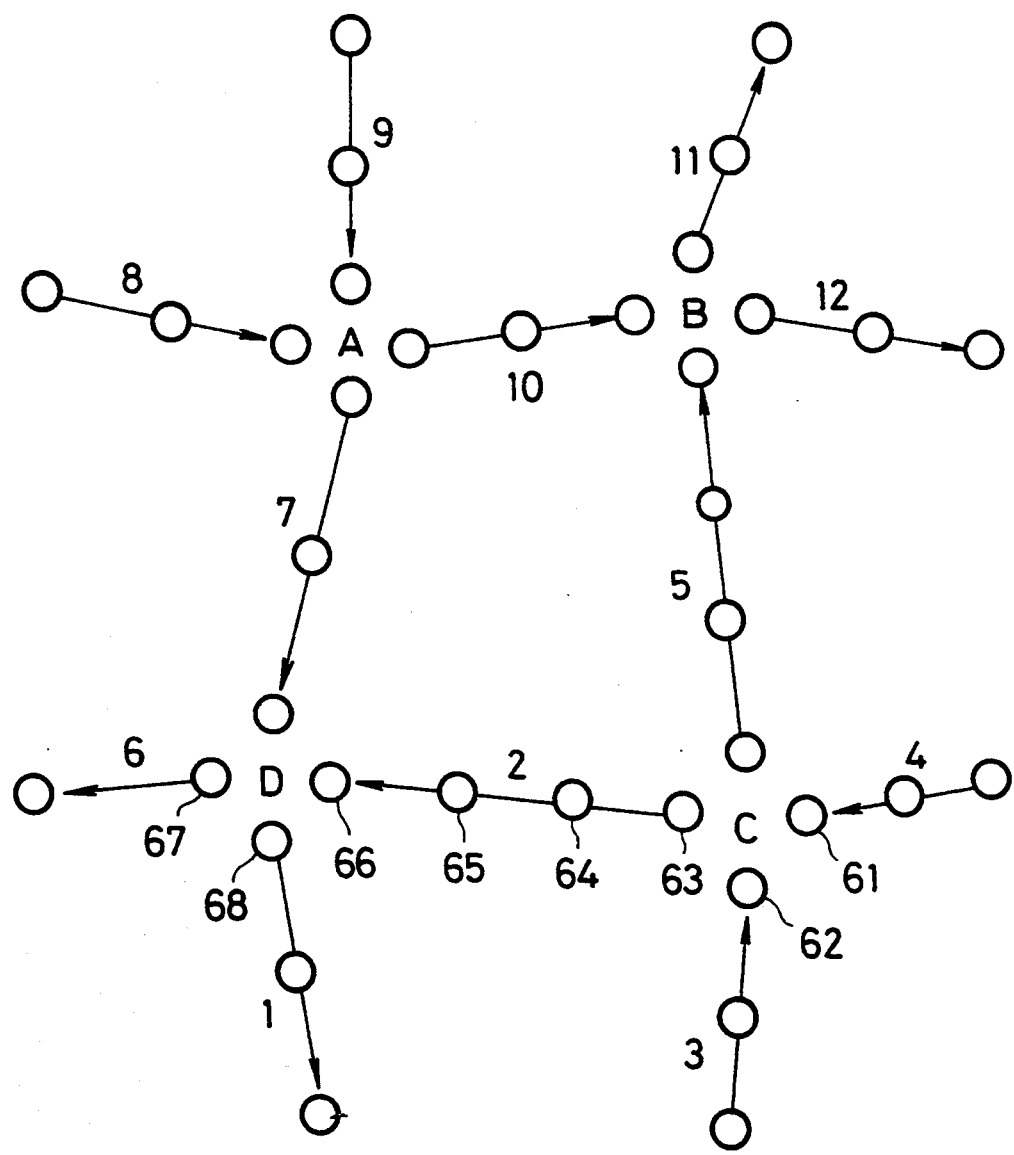
FIG. 6 is an exemplary diagram of a physical system network adapted to one mebodiment of the method for an identification, a forecast, and a control of a non-linear flow physical system network according to the present invention.

Referring now to FIG. 6, one embodiment of a method for an identification, a forecast, and a control of a non-linear flow on a physical system network according to the present invention will be described in detail.

Figure 4:
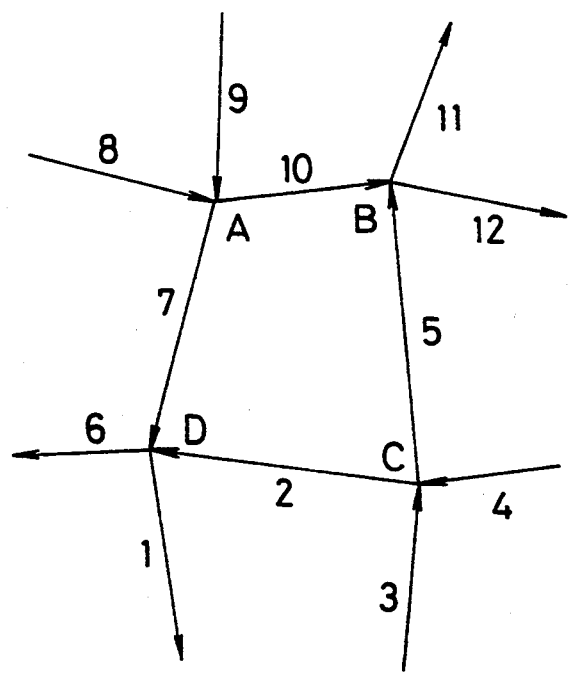
FIG. 4 is an exemplary diagram of a physical system network of which an identification, a forecast, and a control of a non-linear flow are to be made.
Figure 5:
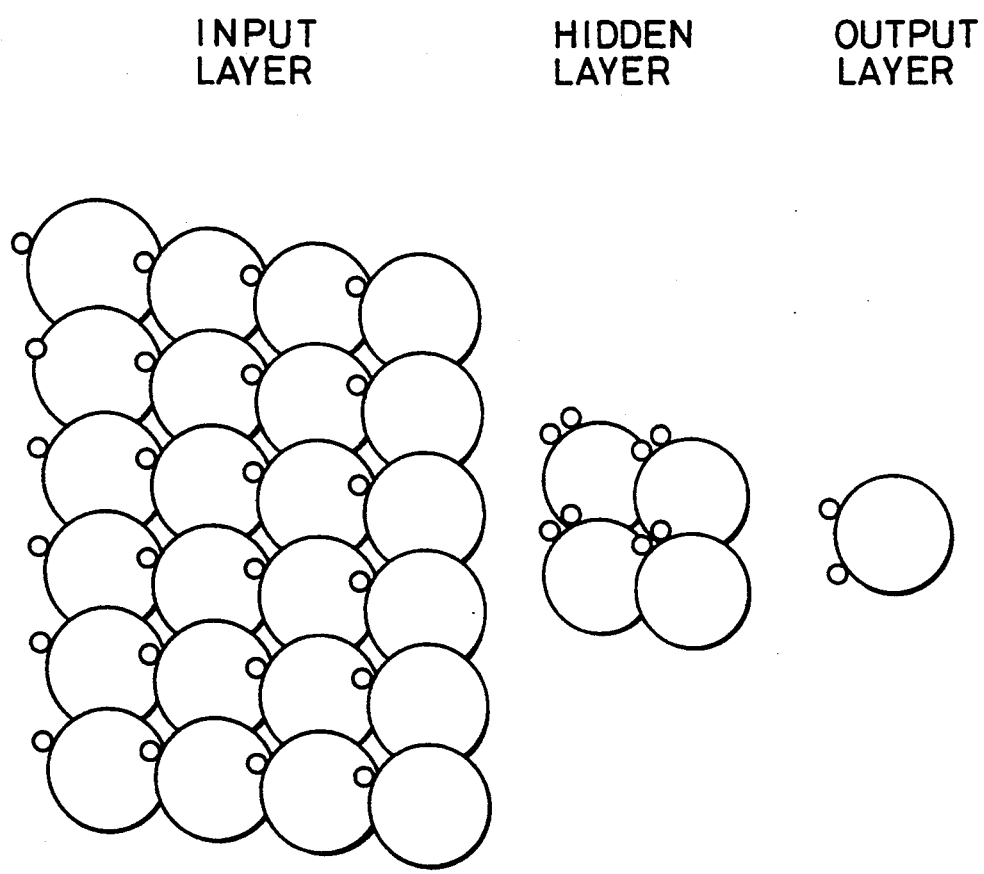
FIG. 5 is a conceptual diagram of a three-layer perceptron, conventionally utilized for an identification, a forecast, and a control of a non-linear flow on a physical system network.

According to the present invention, the physical system network such as that shown in FIG. 4 is adapted to a form shown in FIG. 6, in which each branch between nodes is divided by a plurality of division points.

Here, in general, the branch i is divided into $N(i)$ pieces of sections, and the coordinates of an initial point, each division point, and a terminal point of this branch i are denoted as $x_{i, 0}, x_{i, 1}, \ldots, X_{i, N(i)}$, respectively, while the flows at the initial point, each division point, and the terminal point in this branch i are denoted as $q_{i, 0}, q_{i, 1}, \ldots, q_{i, N(i)}$, respectively, and the concentrations at each division point and the terminal point in this branch i are denoted as $k_{i, 1}, \ldots, k_{i, N(i)}$, respectively.

Also, the non-linear relationship between the flow $q(x, t)$ and the concentration $k(x, t)$ expressed by the following equation (7) is assumed.

$$q(x, t) = f(k(x, t); A(x)) \tag{7}$$

where f is a non-linear function, and $A(x)$ is a parameter specifying a form of the non-linear function f at a coordinate point x.

In addition, when a sink and a source of the flow are assumed to be present in the physical system network, the following equation of continuity (8) must be satisfied.

$$\frac{\partial k(x, t)}{\partial t} = -\frac{\partial q(x, t)}{\partial x} - g(x) q(x, t) + h(x) \tag{8}$$

where $g(x)$ is a parameter representing a sink of the flow at a coordinate point x, and $h(x)$ is a parameter representing a source of the flow at a coordinate point x.

When the spatial frequency expected for the parameters $A(x)$, $g(x)$, and $h(x)$ is denoted as $\Omega$, and a length of a branch i is denoted as $L_i$, the number of divided sections $N(i)$ can be expressed by the following equation (9).

$$N(i) = \Omega L_i \tag{9}$$

For example, in the physical system network of FIG. 6, the branch 2 having a node C as an initial point and a node D as a terminal point has $N(2)=3$, such that the initial point 63 has a coordinate $x_{2, 0}$, the terminal point 66 has a coordinate $x_{2, 3}$, and two division points 64 and 65 have the coordinates $x_{2, 1}$ and $x_{2, 2}$, respectively.

Here, the flow $q_{2, 0}$ at the initial point 63 of this branch 2 is defined by the following equation (10).

$$q_{2, 0} = P_{2\ 3}\, q_{3, 2} + P_{2\ 4}\, q_{4, 2} \tag{10}$$

where $q_{3,2}$ is a flow at a terminal point 62 of a branch 3 which is flowing into the node C, $q_{4,2}$ is a flow at a terminal point 61 of a branch 4 which is flowing into the node C, $p_{2,3}$ is a probability for branching from the branch 3 to the branch 2, and $p_{2,4}$ is a probability for branching from the branch 4 to the branch 2.

As for the flows $q_{2,1}$, $q_{2,2}$, and $q_{2,3}$ at the division points 64 and 65 and the terminal point 66, the conditions expressed by the following equations (11) to (13) are satisfied, respectively, according to the non-linear relationship of the above equation (7).

$$q_{2,1} = f(k_{2,1}; A_{2,1}) \tag{11}$$

$$q_{2,2} = f(k_{2,2}; A_{2,2}) \tag{12}$$

$$q_{2,3} = f(k_{2,3}; A_{2,3}) \tag{13}$$

On the other hand, for the division points 64 and 65, the following equations (14) and (15) can be obtained by discretizing the above equation (8), by replacing the spatial differentiation in the above equation (8) with a central difference.

$$\frac{\partial k_{2,1}}{\partial t} = \frac{q_{2,2} - q_{2,0}}{x_{2,2} - x_{2,0}} - g_{2,1} q_{2,1} + h_{2,1} \tag{14}$$

$$\frac{\partial k_{2,2}}{\partial t} = \frac{q_{2,3} - q_{2,1}}{x_{2,3} - x_{2,1}} - g_{2,2} q_{2,2} + h_{2,2} \tag{15}$$

Similarly, for the terminal point 66, the following equation (16) can be obtained by discretizing the above equation (8), by replacing the spatial differentiation in the above equation (8) with a backward difference.

$$\frac{\partial k_{2,3}}{\partial t} = \frac{q_{2,3} - q_{2,2}}{x_{2,3} - x_{2,2}} - g_{2,3} q_{2,3} + h_{2,3} \tag{16}$$

Figure 7:
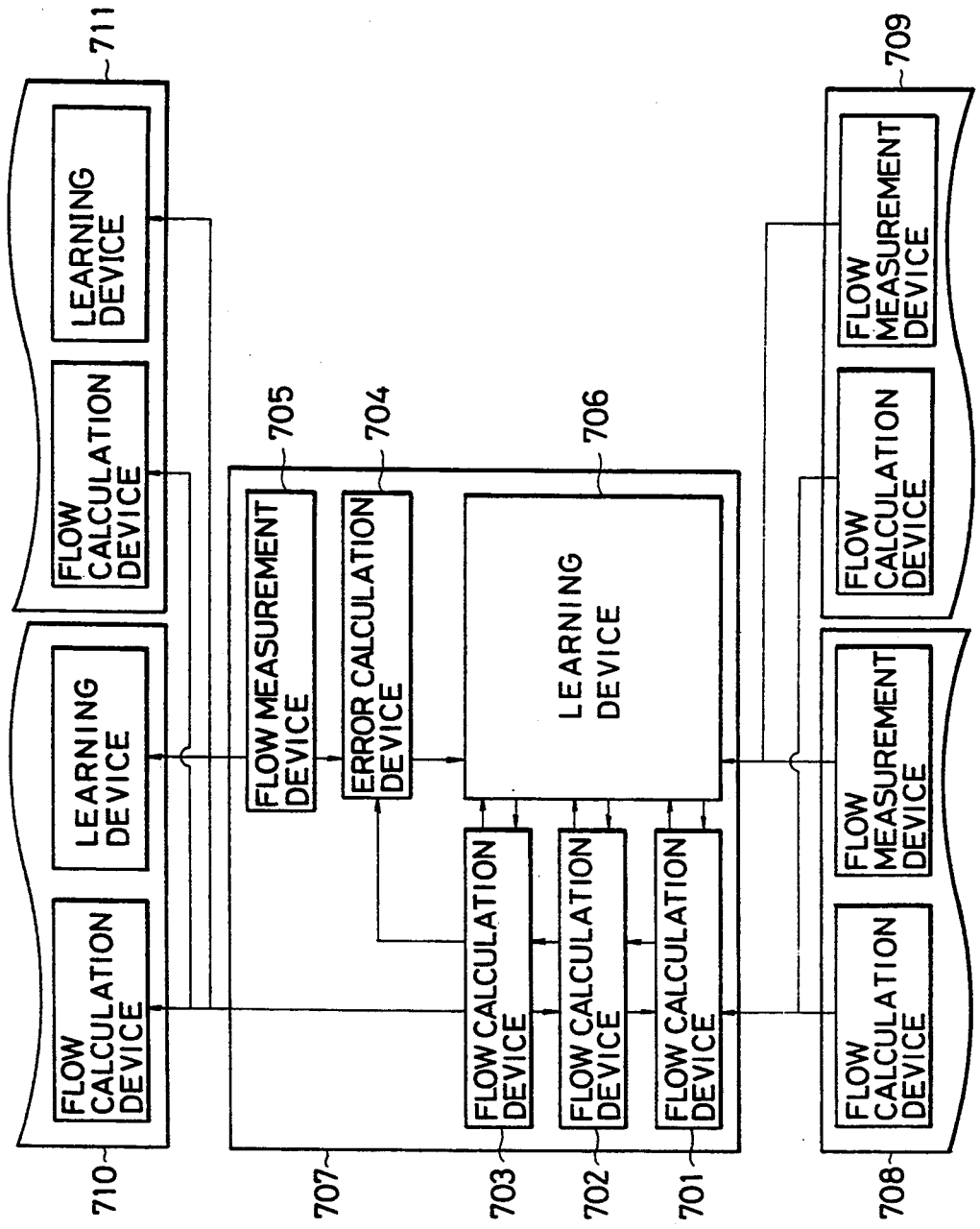
FIG. 7 is a block diagram of one mebodiment of the apparatus for an identification and a forecast of a non-linear flow on a physical system network according to the present invention.

Referring now to FIG. 7, one embodiment of an apparatus for an identification and a forecast of a non-linear flow on a physical system network according to the present invention will be described in detail. Here, this FIG. 7 only shows a configuration corresponding to a part around the branch 2 in the physical system network shown in FIG. 6, as a concrete illustrative example.

In this configuration of FIG. 7, a module 707 represents the branch 2, while the modules 708, 709, 710, and 711 represent the branches 3, 4, 1, and 6, respectively.

The module 707 comprises: flow calculation devices 701, 702, and 703 provided in correspondence to the division points (64) and (65) and the terminal point (66), respectively, for calculating the flows at these points; a flow measurement device for measuring the actually observed flow at the terminal point (66); an error calculation device 704 for calculating the error of the flow calculated by the flow calculation device 703 with respect to the actually observed flow measured by the flow measurement device 705; and a learning device 706 for realizing the learning by adjusting a relationship between the flow and the concentration, a weight value of the connection at each node, a weight value of a recursive connection, and a weight value of a threshold, which are to be described below, so as to minimize the error calculated by the error calculation device 704.

Note here that each of the other modules 708, 709, 710, and 711 also has a configuration substantially similar to this module 707, although these other modules are depicted only partially in FIG. 7.

Figure 8:
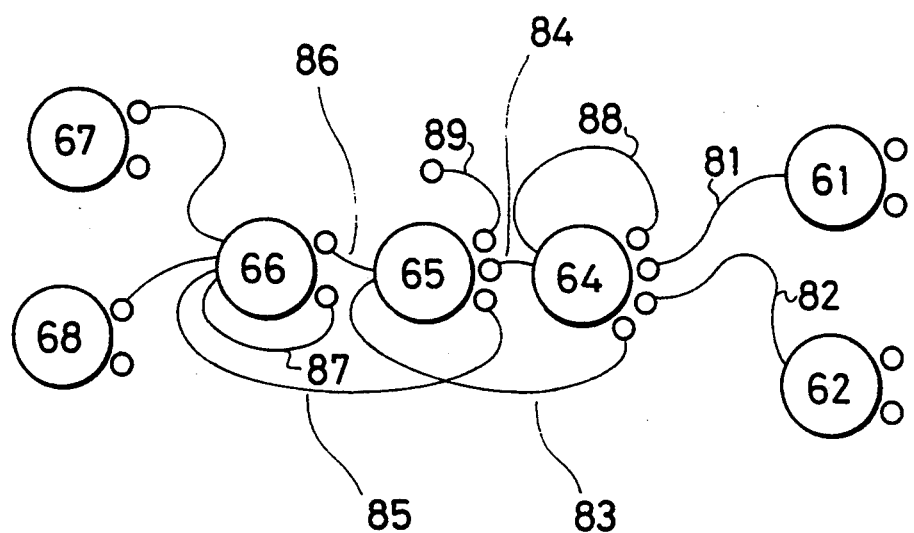
FIG. 8 is a detailed diagram of a neural network model corresponding to one branch in the physical system network of FIG. 6, showing connections realized by the apparatus of FIG. 7 among the division points.

Now, the branch 2 represented by the module 707 can be conceptually represented by a neural network model diagram shown in FIG. 8. In this conceptual diagram of FIG. 8, blocks 61, 62, and 64 to 68 represents the corresponding flow calculation devices in FIG. 7 located at the division points 64 and 65, the terminal points 61, 62, and 66, and the initial points 67 and 68. On the other hand, the lines 81 to 86 represents the connections between neighboring blocks, the lines 87 and 88 represents the recursive connections for the block 66 and 64, and the line 89 represents the threshold.

More specifically, the line 81 has the connection weight value equal to the probability $p_{2,4}$ for branching from the branch 4 to the branch 2, and the line 82 has the connection weight value equal to the probability $p_{2,3}$ for branching from the branch 3 to the branch 2, where the actual values of these connection weight values are to be determined by the learning.

The line 83 has the connection weight value equal to the central difference factor $-1/(x_{2,2} - x_{2,0})$, and the line 84 has the connection weight value equal to the central difference factor $+1/(x_{2,3} - x_{2,1})$, while the line 85 has the connection weight value equal to the central difference factor $-1/(x_{2,3} - x_{2,1})$.

The line 86 has the connection weight value equal to the backward difference factor $+1/(x_{2,3} - x_{2,2})$, while the line 87 is the recursive connection for the block 66 which has the connection weight value equal to the backward difference factor $-1/(x_{2,3} - x_{2,2})$.

The line 88 is the recursive connection for the block 64 which corresponds to the sink $g_{2,1}$ of the flow at the division point 64, while the line 89 is the threshold for the block 65 which corresponds to the source $h_{2,2}$ of the flow at the division point 65, where the actual values of the connection weight values for these lines 88 and 89 are to be determined by the learning.

Figure 1:
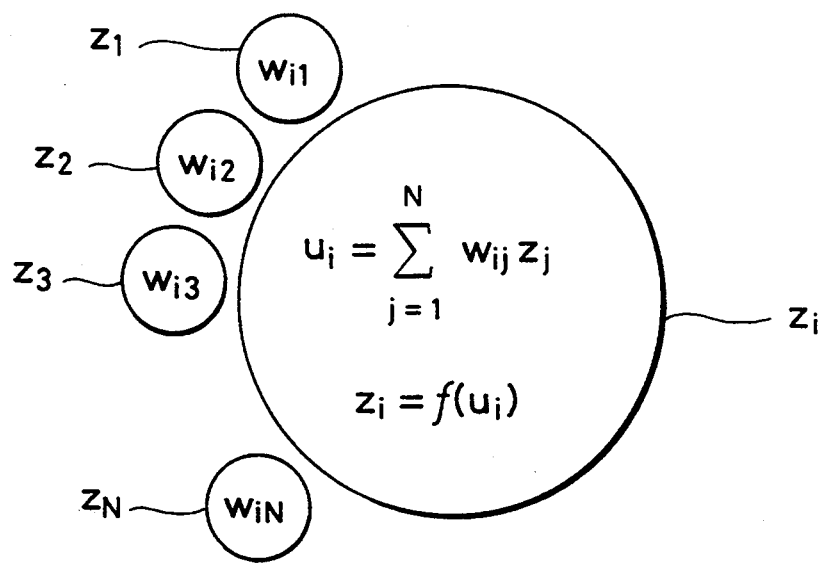
FIG. 1 is a conceptual diagram of a unit in a multi-layer perceptron according to the discrete-time continuous-output model.
Figure 2:
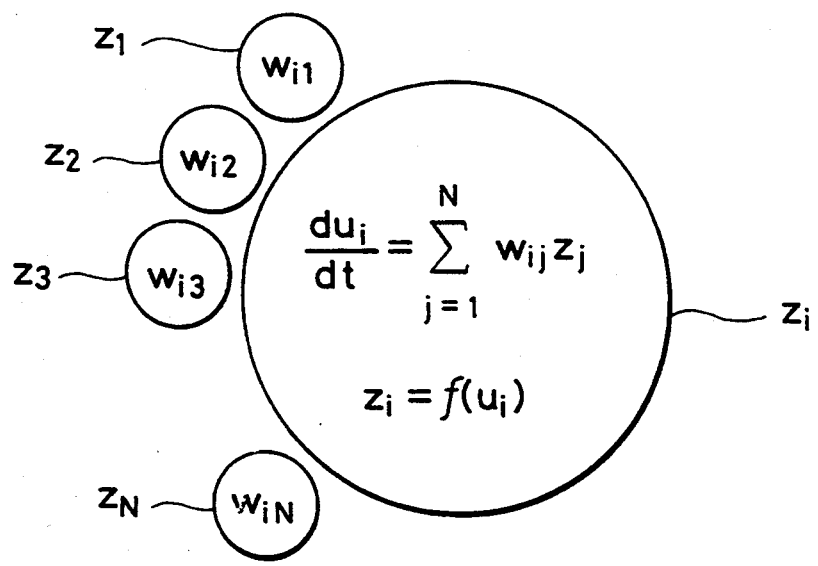
FIG. 2 is a conceptual diagram of a unit in a multi-layer perceptron according to the continuous-time continuous-output model.
Figure 3:
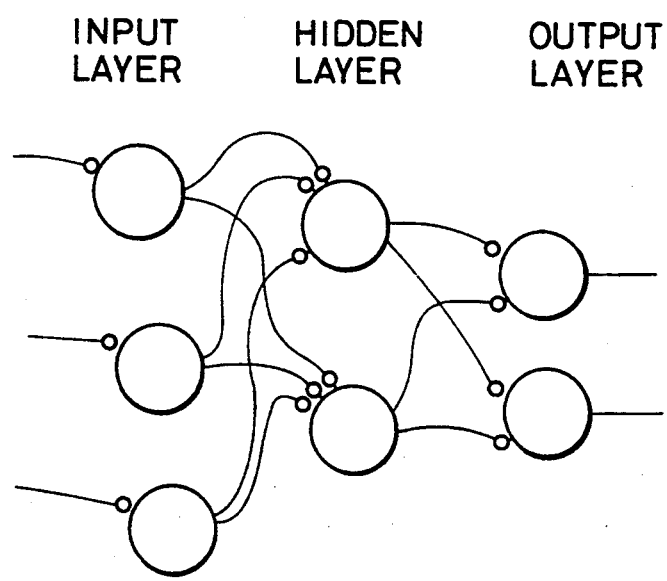
FIG. 3 is a conceptual diagram of an exemplary configuration of a three-layer perceptron.

Each flow calculation device represented by each block in this embodiment is realized by the unit in the continuous-time continuous-output model shown in FIG. 2 described above, which obtains the output in a form of the flow. Thus, each of the flow calculation devices 701, 702, and 703 calculates the flow as its output by calculating a sum of outputs of the neighboring blocks multiplied by their respective connection weight values according to the above discretized differential equations (14) to (16), obtaining the concentration $k_t$ for the present time t from the concentration $k_{t-\Delta t}$ for the previous time as $k_t = k_{t-\Delta t} + \Delta t \cdot dk/dt$, and applying the non-linear transformation according to the above equations (11) to (13). In other words, each flow calculation device calculates the flow according to the relationship between the flow and the concentration, the weight value of the connection at each node, the weight value of the connection between each neighboring division points, the weight value of the recursive connection, and the weight value of the threshold.

The learning device 706 determines the optimum settings for the relationship between the flow and the concentration, the weight value of the connection at each node, the weight value of the recursive connection, and the weight value of the threshold as follows. Here, as an illustrative example, a case of determining the source $h_{2,n}$ (n=1, 2, 3) such as that represented by the appropriate connection weight value of the threshold 89 will be described.

First, in order to provide a set of the desired outputs for the given inputs, the actual flows are measured at the terminal points 61, 62, and 66 between the time $t=t_1$ and the time $t=t_2$, and the measured flows are denoted as $Q_{4,2}(t)$, $Q_{3,2}(t)$, and $Q_{2,3}(t)$, respectively. Also, the output of the flow calculation device at the terminal point 66 when the output of the terminal points 61 and 62 are $Q_{4,2}(t)$ and $q_{3,2}(t)$, respectively, is denoted by $q_{2,3}(t)$.

In this case, the objective function E is defined by the following equation (17).

$$E = \frac{1}{2} \sum_{t=t_1}^{t_2} (q_{2,3}(t) - Q_{2,3}(t))^2 \tag{17}$$

Then, the source $h_{2,n}$ which minimizes this objective function E can be obtained as the convergence points $h_{2,n}(\infty)$ of the solution of the following differential equation (18).

$$\frac{dh_{2,n}}{\partial t} = -\frac{\partial E}{\partial h_{2,n}} \tag{18}$$

Here, the partial differentiation on the right hand side of this differential equation (18) can be rewritten in a form expressed by the following equation (19).

$$\frac{\partial E}{\partial h_{2,n}} = \sum_{t=t_1}^{t_2} (q_{2,3}(t) - Q_{2,3}(t)) \frac{\partial q_{2,3}}{\partial k_{2,3}} \frac{\partial k_{2,3}}{\partial h_{2,n}} \tag{19}$$

In this expression given by the equation (19), the partial derivative $\partial q_{2,3}/\partial k_{2,3}$ can be obtained from the non-linear function f, while the partial derivative $\partial k_{2,3}/\partial h_{2,n}$ can be obtained by numerically solving the following simultaneous differential equations (20) to (22) for $\partial k_{2,m}/\partial h_{2,n}$ (n, m=1, 2, 3).

$$\frac{d}{dt} \frac{\partial k_{2,1}}{\partial h_{2,n}} = -\frac{1}{x_{2,2}-x_{2,0}}\left(f(k_{2,2})\frac{\partial k_{2,2}}{\partial h_{2,n}}\right) - \tag{20}$$

$$g_{2,1}f(k_{2,1})\frac{\partial k_{2,1}}{\partial h_{2,n}} + \delta_{1n}$$

$$\frac{d}{dt}\frac{\partial k_{2,2}}{\partial h_{2,n}} = \tag{21}$$

$$-\frac{1}{x_{2,3}-x_{2,1}}\left(f(k_{2,3})\frac{\partial k_{2,3}}{\partial h_{2,n}} - f(k_{2,1})\frac{\partial k_{2,1}}{\partial h_{2,n}}\right) -$$

$$g_{2,2}f(k_{2,2})\frac{\partial k_{2,2}}{\partial h_{2,n}} + \delta_{2n}$$

$$\frac{d}{dt}\frac{\partial k_{2,3}}{\partial h_{2,n}} = \tag{22}$$

$$-\frac{1}{x_{2,3}-x_{2,2}}\left(f(k_{2,3})\frac{\partial k_{2,3}}{\partial h_{2,n}} - f(k_{2,2})\frac{\partial k_{2,2}}{\partial h_{2,n}}\right) -$$

$$g_{2,3}f(k_{2,3})\frac{\partial k_{2,3}}{\partial h_{2,n}} + \delta_{3n}$$

where $\delta_{i,n}$ is the Kronecker's delta.

It is to be noted that $g_{2,n}$ (n=1, 2, 3), $A_{2,n}$ (n=1, 2, 3), and $P_{2,j}$ (j=3, 4) can also be obtained in exactly the same manner as described above for $h_{2,n}$ (n=1, 2, 3), by using the following differential equations (23) (24), and (25) respectively, instead of the differential equation (18) used above.

$$\frac{dg_{2,n}}{\partial t} = -\frac{\partial E}{\partial g_{2,n}} \tag{23}$$

$$\frac{dA_{2,n}}{\partial t} = -\frac{\partial E}{\partial A_{2,n}} \tag{24}$$

$$\frac{dp_{2j}}{\partial t} = -\frac{\partial E}{\partial p_{2j}} \tag{25}$$

It is also to be noted that the similar parameters for the other branches can also be obtained in exactly the same manner as described above.

The parameters $h_{2,n}$ and $g_{2,n}$ determined in this manner corresponds to the source and the sink of the flow, while the parameter $A_{2,n}$ determined in this manner specifies the non-linear relationship between the flow and the concentration, and the $P_{2,j}$ determined in this manner specifies the flow branching probability at the node, so that these parameteres are the system dynamics parameters for specifying the dynamis of the physical system represented by the physical system network that can be derived from the result of the learning.

As a consequence, by using these system dynamics parameters, it becomes possible in this embodiment to estimate the position of the obstacle or the bottlenecking portion on the physical system network.

Figure 9:
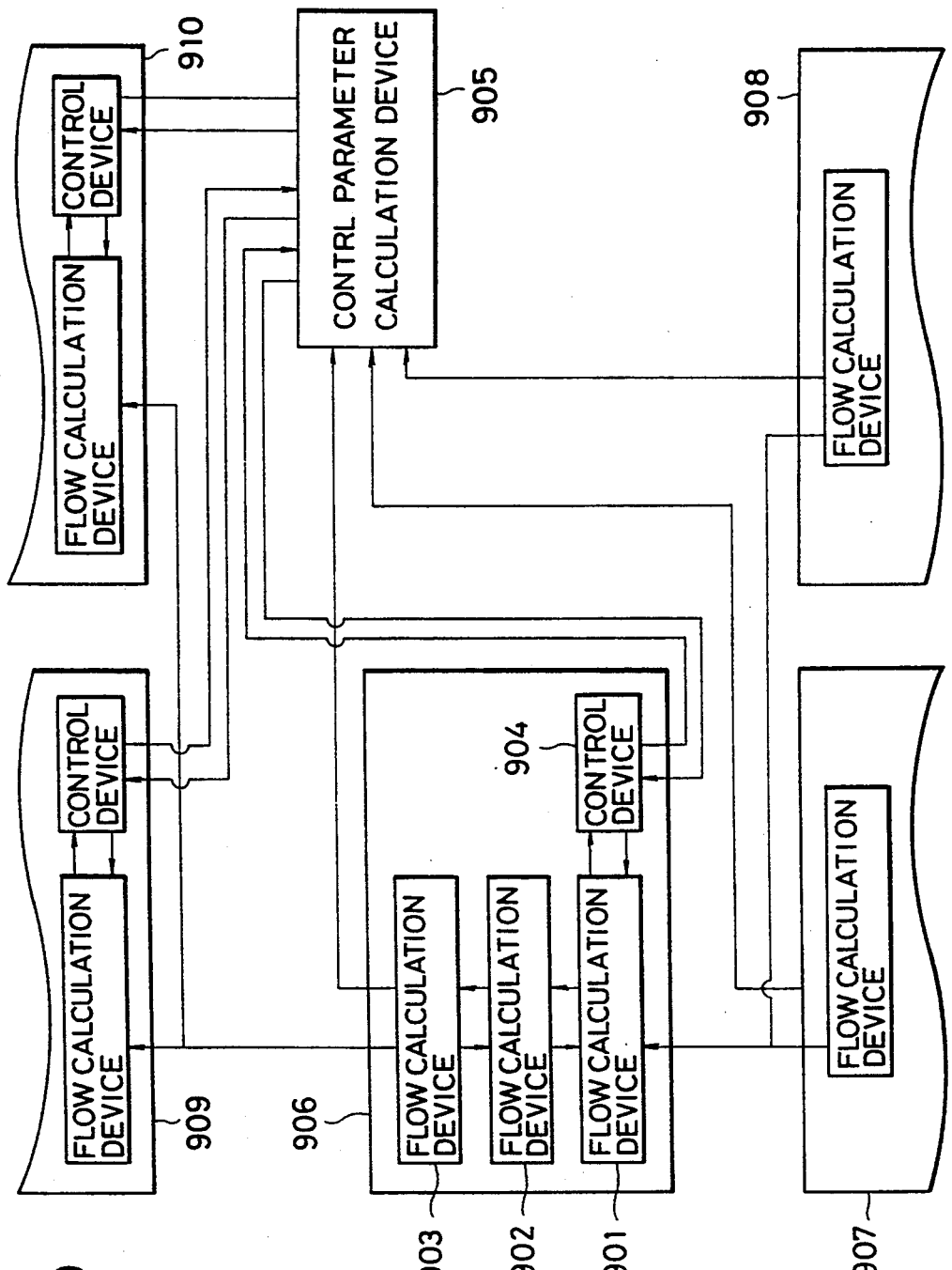
FIG. 9 is a block diagram of one mebodiment of the apparatus for a control of a non-linear flow on a physical system network according to the present invention.

Referring now to FIG. 9, one embodiment of an apparatus for a control of a non-linear flow on a physical system network according to the present invention will be described in detail. Here, this FIG. 9 only shows a configuration corresponding to a part around the branch 2 in the physical system network shown in FIG. 6, as a concrete illustrative example. Also, in the following, a case of realizing a control for maximizing the flow will be described as an illustrative example.

In this configuration of FIG. 9, a module 9067 represents the branch 2, while the modules 907, 908, 909, and 910, represent the branches 3, 4, 1, and 6, respectively.

The module 906 comprises: flow calculation devices 901, 902, and 903 provided in correspondence to the division points (64) and (65) and the terminal point (66), respectively, for calculating the flows at these points; and a control device 904 for connecting/disconnecting connections at the initial point 63 of the branch 2.

Note here that each of the other modules 907, 908, 909, and 910 also has a configuration substantially similar to this module 906, although these other modules are depicted only partially in FIG. 9.

In addition, the configuration of FIG. 9 further includes a control parameter calculation device 905 for determining connections to be connected/disconnected at each node, in order to optimize the objective function.

Now, the connecting/disconnecting of the connections at the initial point 63 of the branch 2 will be considered. In this case, when no control is made, the equation (10) described above is satisfied. Then, assuming that it is impossible to flow into the branch 2 from both of the branches 3 and 4 simultaneously, a control parameter $s_c \in \{-1, 1\}$ for expressing the connecting/disconnecting of the connections at the node C is defined, such that when $s_c=1$, the flow from the branch 3 to the branch 2 is permitted (connected) but the flow from the branch 4 to the branch 2 is prohibited (disconnected), whereas when $s_c=-1$, the flow from the branch 4 to the branch 2 is permitted (connected) but the flow from the branch 3 to the branch 2 is prohibited (disconnected).

Then, the following equation (26) is satisfied at the initial point 63 of the branch 2.

$$q_{2,0} = \frac{1 + s_c}{2} p_{2,3} q_{3,2} + \frac{1 - s_c}{2} p_{2,4} q_{4,2} \quad (26)$$

Figure 10:
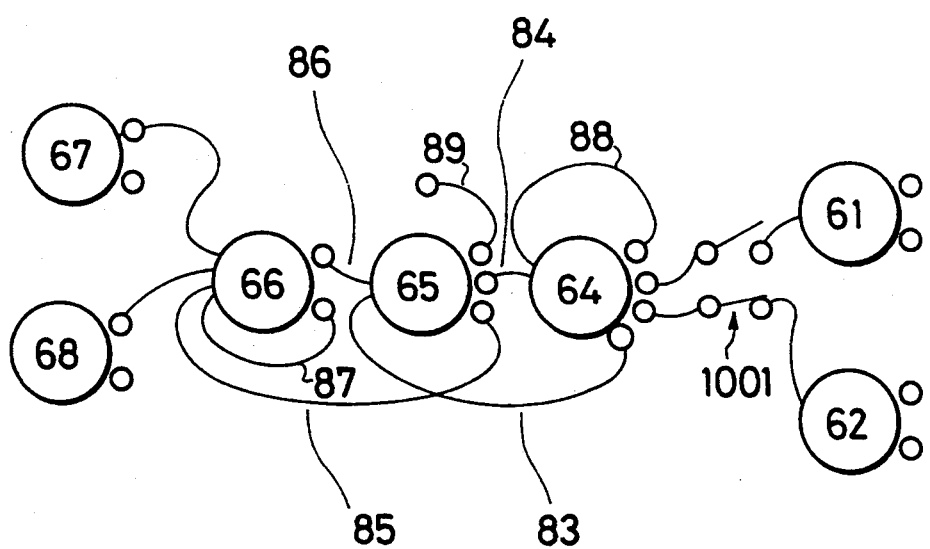
FIG. 10 is a detailed diagram of a neural network model corresponding to one branch in the physical system network of FIG. 6, showing connections realized by the apparatus of FIG. 9 among the division points.

Thus, the branch 2 represented by the module 906 can be conceptually represented by a neural network model diagram shown in FIG. 10 which incorporates a switch 1001 corresponding to the control parameter $s_c$, in addition to the features similar to the neural network model shown in FIG. 8 described above.

In this embodiment, the control parameter $s_k$ (k=A, B, C, D; $s_k \in \{-1, 1\}$) is defined for each node on the physical system network, and each node is controlled similarly. Here, the flow $q_{i,j}$ at each division or terminal point of each branch on the physical system network will be a function of these control parameters $q_{i,j}(s_A, s_B, s_C, s_D)$, which can be calculated in the manner similar to that described above.

In order to realize the control for maximizing the flow, a target function F to be maximized is set to the average value of these flows, as expressed by the following equation (27).

$$F = <q_{i,j}(s_A, s_B, s_C, s_D)> \quad (27)$$

Then, the control parameter calculation device 905 calculates the partial derivative $\partial F/\partial s_k$ (k=A, B, C, D), and when this partial derivative is positive, the control parameter $s_k$ is determined to be +1, whereas when this partial derivative is negative, the control parameter $s_k$ is determined to be −1.

In response, the control device 904 of the module 906 connects/disconnects the connections at the initial point 63 of the branch 2 according to the value of the control parameter $s_c$ determined by the control parameter calculation device 905.

Now, an application of the above described embodiment of a method for an identification, a forecast, and a control of a non-linear flow on a physical system network according to the present invention to a case of the traffic flow will be described.

In this case, the traffic flow q(x, t) and the vehicle concentration k(x, t) has the non-linear relationship expressed by the following equation (28). (See D. C. Gazis (ed.), "Traffic Science", John Wiley & Sons, 1974, especially, Chapter I, Section IV, pp. 69–73, for further detail.)

$$\begin{aligned} q(x, t) &= f(k(x, t); V(x), K(x)) \\ &= V(x)\left(k(x, t) - \frac{k(x, t)^2}{K(x)}\right) \end{aligned} \quad (28)$$

where V(x) is a free driving speed at a position x, and K(x) is a jam concentration. In addition, the equation of continuity (8) described above must also be satisfied.

Here, by constructing the apparatus for an identification and a forecast of a non-linear flow on a physical system network according to the present invention as shown in FIG. 7, in accordance with the connection state (topology) of the traffic network in this case, with the actual traffic flow measured at the terminal point of each branch, the parameters V(x), K(x), g(x), and h(x) at each division point and a terminal point of each branch can be determined by the learning as described above, so as to make the traffic flow obtained by the flow calculation device provided at the terminal point of each branch coincides with the actual traffic flow at the terminal point of each branch measured by the flow measurement device. These parameters so determined provide the estimation for the system dynamics parameters including the free driving speed, the jam concentration, the sink of the traffic flow, and the source of the traffic flow, at each point on this traffic network, so that it becomes possible to estimate the position of the obstacle or the bottlenecking portion on this traffic network.

Also, by constructing the apparatus for a control of a non-linear flow on a physical system network according to the present invention as shown in FIG. 9, in accordance with the connection state (topology) of the traffic network in this case, with the control device in a form of a traffic signal provided, it becomes possible to realize the control for maximizing the traffic flow in this traffic network, provided that the parameters V(x), K(x), g(x), and h(x) at each division point and a terminal point of each branch have been determined by the learning as described above.

As described, according to the present invention, it becomes possible to provide a method and an apparatus for an identification, a forecast, and a control of a non-linear flow on a physical system network, capable of accounting for the connection state (topology) of the physical system network, because the learning is achieved by using a configuration in which the flow calculation device provided at each division point dividing each branch between nodes.

In addition, because of this configuration, it also becomes possible to carry out the learning of the neural network for each of the divided sections separately, and the learning for different divided sections may be carried out in parallel. As a consequence, it becomes possible for a method and an apparatus according to the present invention to obtain the desired convergence to the global minimum in the learning, even in a case of dealing with a large scale physical system network, so that the present invention is even more effective for the large scale physical system network.

Moreover, it also becomes possible to provide a method and an apparatus for an identification of a non-linear flow on a physical system network, capable of deriving the system dynamics parameters specifying the dynamics of the physical system represented by the physical system network, such as the sink and the source at non-observed points on the physical system network, from the result of the learning, in the manner described above.

Furthermore, it also becomes possible to provide a method and an apparatus for a forecast and a control of a non-linear flow on a physical system network, capable of making the forecast and carrying out the control for an arbitrary time, because the leaning of the neural network is achieved by using a flow calculation device in a form of a unit in the continuous-time continuous-output model.

It is to be noted that the method and an apparatus for an identification, a forecast, and a control of a non-linear flow on a physical system network according to the present invention as described above are applicable to wide ranging fields of a non-linear flow identification and control in general, such as the field of the traffic flow identification and control in which the traffic flow is to be identified and the traffic signals are to be controlled as described above, and the field of the communication identification and control on the communication network.

It is further to be noted here that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for identifying, forecasting and controlling a non-linear flow on a physical system network formed by branches and nodes and representing a physical system having dynamics specified by system dynamics parameters, comprising the steps of:
   (a) representing the physical system network by a neural network model by dividing each branch between the nodes in the physical system network by a plurality of division points, assigning each unit of neural network to each of the division points, an initial point, and a terminal point of said each branch, and specifying neural network model parameters for indicating connections among units of the neural network;
   (b) calculating a flow of each of the division points and (a) the terminal point of said each branch according to the neural network model parameters specifying connections among the division points and the terminal point in a neural network model representing the physical system network;
   (c) measuring an actual flow in the physical system at a location of the terminal point of said each branch in the physical system network;
   (d) calculating an error of the flow at the terminal point calculated at step (b) with respect to the actual flow at the terminal point measured at step (c);
   (e) adjusting the neural network model parameters, so as to minimize the error calculated at step (d); and
   (f) determining the system dynamics parameters specifying the dynamics of the physical system represented by the physical system network, according to the neural network model parameters adjusted at step (e).

2. The method of claim 1, wherein at the steps (b) and (e), the flow at each of the division points and the terminal point of said each branch is defined non-linearly by a concentration at each of the division points and the terminal point of said each branch, and the neural network model parameters comprise a relationship between the flow and (a) the concentration, weight values of connections at each node, weight values of connections among the division points and the terminal point, weight values of recursive connections, and weight values of thresholds.

3. The method of claim 2, wherein the relationship between the flow and the concentration is non-linear.

4. The Method of claim 1, wherein at the step (b), the flow is calculated by a unit in a continuous-time continuous-output model provided in the neural network model in correspondence to each of the division points and the terminal point of said each branch.

5. The Method of claim 1, wherein at the step (f), the system dynamics parameters comprise a parameter specifying a relationship between the flow and a concentration at each of the division points and the terminal point, a parameter specifying a flow branching probability at each node, a parameter specifying a sink of the flow at each of the division points, and a parameter specifying a source of the flow at each of the division points.

6. The Method of claim 5, wherein at the step (f), the parameter specifying the sink of the flow at each of the division points is determined from weight values of recursive connections at said each of the division points adjusted at the step (e).

7. The Method of claim 5, wherein at the step (f), the parameter specifying the source of the flow at each of the division points is determined from weight values of thresholds at said each of the division points adjusted at step (e).

8. The Method of claim 1, further comprising the steps of:
   (g) defining a control parameter specifying connecting/disconnecting of connections among branches at each node;
   (h) calculating a target function to be optimized in terms of flows at the division points and the terminal point of said branches in the physical system network as a function of the control parameter defined at step (g); and
   (i) connecting/disconnecting the connections among branches at each node, so as to optimize the target function calculated at step (h).

9. The Method of claim 8, wherein at the step (h), the target function to be optimized is calculated as an average value of the flows.

10. The Method of claim 8, wherein at the step (i), the connections among branches at each node is connected/disconnected to maximize the target function.

11. An apparatus for an identification, a forecast, and a control of identifying, forecasting and controlling a non-linear flow on a physical system network formed by branches and nodes and representing a physical system having dynamics specified by system dynamics parameters, in which the physical system network is represented by a neural network model by dividing each branch between the nodes by a plurality of division points, assigning each unit of neural network to each of the division points, an initial point, and a terminal point of said each branch, and specifying neural network model parameters for indicating connections among units of the neural network, the apparatus comprising:
   flow calculation means for calculating a flow at each of the division points and (a) the terminal point of said each branch according to the neural network model parameters;
   flow measurement means for measuring an actual flow in the physical network at a location of the terminal point of said each branch in the physical system network;
   error calculation means for calculating an error of the flow at the terminal point calculated by the flow calculation means with respect to the actual flow at the terminal point measured by the flow measuring means;
   learning means for adjusting the neural network model parameters, so as to minimize the error calculated by the error calculation means; and
   determining means for determining the system dynamics parameters specifying the dynamics of the physical system represented by the physical system network, according to the neural network model parameters adjusted by the learning means.

12. The apparatus of claim 11, wherein the flow at each of the division points and the terminal point of said each branch is defined non-linearly .by a concentration at each of the division points and the terminal point of said each branch, and the flow calculation means and the learning means uses the neural network model parameters comprising a relationship between the flow and (a) the concentration, weight values of connections at each node, weight values of connections among the division points and the terminal point, weight values of recursive connections, and weight values of thresholds.

13. The apparatus of claim 12, wherein the relationship between the flow and the concentration is non-linear.

14. The apparatus of claim 11, wherein the flow calculation means is formed by a unit in a continuous-time continuous-output model provided in the neural network model in correspondence to each of the division points and the terminal point of said each branch.

15. The apparatus of claim 11, wherein the determining means determines the system dynamics parameters comprising a parameter specifying a relationship between the flow and a concentration at each of the division points and the terminal point, a parameter specifying a flow branching probability at each node, a parameter specifying a sink of the flow at each of the division points, and a parameter specifying a source of the flow at each of the division points.

16. The apparatus of claim 15, wherein the determining means determines the parameter specifying the sink of the flow at each of the division points from weight values of recursive connections adjusted by the learning means.

17. The apparatus of claim 15, wherein the determining means determines the parameter specifying the source of the flow at each of the division points from weight values of thresholds adjusted by the learning means.

18. The apparatus of claim 11, further comprising:
target function calculation means for calculating a target function to be optimized given in terms of flows at the division points and the terminal point of branches at each node in the physical system network as a function of a control parameter specifying connecting/disconnecting of connections among said branches at said each node; and
control means for connecting/disconnecting the connections among said branches at said each node, so as to optimize the target function calculated by the target function calculation means.

19. The apparatus of claim 18, wherein the target function calculation means calculates the target function to be optimized as an average value of the flows.

20. The apparatus of claim 18, wherein the control means connects/disconnects the connections among said branches at said each node to maximize the target function.

* * * * *